US010071519B2

(12) United States Patent
Gross

(10) Patent No.: US 10,071,519 B2
(45) Date of Patent: Sep. 11, 2018

(54) PARISON HEAD WITH TRIFUNCTIONAL COMPONENT AND METHOD FOR DISCHARGING A PARISON

(71) Applicant: Heinz Gross, Rossdorf (DE)

(72) Inventor: Heinz Gross, Rossdorf (DE)

( * ) Notice: Subject to any disclaimer, the term of this patent is extended or adjusted under 35 U.S.C. 154(b) by 446 days.

(21) Appl. No.: 14/442,512

(22) PCT Filed: Nov. 9, 2013

(86) PCT No.: PCT/EP2013/003383
§ 371 (c)(1),
(2) Date: May 13, 2015

(87) PCT Pub. No.: WO2014/075786
PCT Pub. Date: May 22, 2014

(65) Prior Publication Data
US 2016/0271854 A1 Sep. 22, 2016

(30) Foreign Application Priority Data
Nov. 15, 2012 (DE) .......................... 10 2012 022 409

(51) Int. Cl.
*B29C 47/12* (2006.01)
*B29C 47/92* (2006.01)
(Continued)

(52) U.S. Cl.
CPC ........ *B29C 47/124* (2013.01); *B29C 47/0023* (2013.01); *B29C 47/22* (2013.01);
(Continued)

(58) Field of Classification Search
CPC ....... B29C 47/124; B29C 49/04; B29C 47/92; B29C 47/0023; B29C 47/22; B29C 49/78;
(Continued)

(56) References Cited

U.S. PATENT DOCUMENTS 4,076,481 A * 2/1978 Sansone .................. B29C 47/20
425/380
5,346,384 A * 9/1994 Hegler ................ B29C 47/0023
264/508
(Continued)

FOREIGN PATENT DOCUMENTS

DE 2941260 A1 5/1981
DE 102009058361 B3 6/2011
(Continued)

OTHER PUBLICATIONS

International Search Report (dated Mar. 25, 2014) for corresponding International applicaton No. PCT/EP2013/003383.

*Primary Examiner* — Nahida Sultana
(74) *Attorney, Agent, or Firm* — WRB-IP LLP

(57) ABSTRACT

A parison head for discharging a parison for producing capillaries, tubes or pipes, includes a sleeve-shaped housing into which the melt is fed, and which surrounds a core on all sides with a spacing, the core being firmly clamped in the housing, and also a likewise sleeve-shaped die, which likewise surrounds the core on all sides with a spacing, wherein the housing and the die surround the core in such a way that there is a closed flow channel between the housing and the core and between the die and the core, and at the end of the flow channel a peripheral closed outlet gap is formed by the die and the core, wherein there is between the housing and the die a low-cost, quickly exchangeable, trifunctional component, which securely seals off the flow channel between the housing and the die, and with which the angle between the housing and the die and also the length of the head can be changed, while retaining the flow resistance in the region of the trifunctional component and while retaining a flow
(Continued)

channel that is free from dead spots, and so in this way the cross section of the flow channel gap at the end of the flow channel is variable.

4 Claims, 2 Drawing Sheets

(51) Int. Cl.
    *B29C 47/22*     (2006.01)
    *B29C 47/00*     (2006.01)
    *B29C 49/04*     (2006.01)
    B29C 47/08     (2006.01)
    B29C 49/78     (2006.01)

(52) U.S. Cl.
    CPC .............. *B29C 47/92* (2013.01); *B29C 49/04* (2013.01); *B29C 47/0054* (2013.01); *B29C 47/0057* (2013.01); *B29C 47/0808* (2013.01); *B29C 49/78* (2013.01); *B29C 2947/92152* (2013.01); *B29C 2947/92647* (2013.01); *B29C 2947/92904* (2013.01)

(58) Field of Classification Search
    CPC   B29C 2947/92152; B29C 2947/92904; B29C 47/0808; B29C 2947/92647; B29C 47/0057; B29C 47/0054
    See application file for complete search history.

(56) References Cited

U.S. PATENT DOCUMENTS

| | | | |
|---|---|---|---|
| 5,505,887 A * | 4/1996 | Zdrahala ............... | A61L 29/041 264/127 |
| 5,779,959 A * | 7/1998 | Teutsch ............... | B29C 47/0023 264/171.26 |
| 6,045,347 A * | 4/2000 | Hegler ................ | B29C 47/0023 425/133.1 |
| 6,773,249 B1 | 8/2004 | Przytulla et al. | |
| 7,517,210 B1 * | 4/2009 | Hegler ................ | B29C 47/0023 425/233 |
| 7,959,426 B2 * | 6/2011 | Taylor ................ | B29C 47/0023 425/132 |
| 7,980,841 B2 * | 7/2011 | Sutton ................ | B29C 47/0023 264/209.8 |
| 2002/0179232 A1 * | 12/2002 | Thompson .......... | B29C 47/0023 156/244.13 |
| 2004/0074554 A1 * | 4/2004 | Starita ................ | B29C 44/0492 138/137 |
| 2004/0131716 A1 * | 7/2004 | Neubauer ............ | B29C 47/126 425/326.1 |
| 2005/0285297 A1 * | 12/2005 | Park .................... | B29C 47/0023 264/209.1 |
| 2009/0136608 A1 * | 5/2009 | Hegler ................. | B29C 47/126 425/112 |
| 2010/0301526 A1 * | 12/2010 | Hackl ................. | B29C 47/0023 264/563 |
| 2013/0115324 A1 * | 5/2013 | Hegler ................ | B29C 47/0023 425/133.1 |
| 2014/0137354 A1 * | 5/2014 | Newman .................. | A46B 9/04 15/167.1 |
| 2014/0183092 A1 * | 7/2014 | Otaki ...................... | B29C 47/20 206/525 |
| 2017/0087759 A1 * | 3/2017 | Huang ................ | B29C 47/0023 |
| 2018/0001543 A1 * | 1/2018 | Yamasaki ............... | B29C 55/20 |

FOREIGN PATENT DOCUMENTS

FR             1500288 A     11/1967
JP             S63179724 A     7/1988

* cited by examiner

PARISON HEAD WITH TRIFUNCTIONAL COMPONENT AND METHOD FOR DISCHARGING A PARISON

BACKGROUND AND SUMMARY

There are three main requirements which should be met by extrusion heads, by way of which parisons of plastic melts are discharged. First of all, the flow channel in the parison head should be absolutely sealed. Secondly, the flow channels in the extrusion heads also should not have any abrupt jumps in the flow channel geometry which lead to dead spaces, since plastic melts degenerate thermally if they are left at elevated temperatures for a relatively long time. The plastic melt remains at flow channel jumps for a relatively long time and is then damaged thermally in the process. Thirdly, it should of course be the aim for economic reasons to achieve the desired functionality of the parison head with a maximum of operational security in a simple and inexpensive way. Solutions are therefore particularly advantageous, in which as few components as possible are required to meet the technical object which is set. It is always advantageous if components which can fulfill a plurality of technical functions at the same time can be integrated into a construction. In this way, the number of individual components required to achieve a specific technical object which is set can be reduced and the complexity and, as a rule, the susceptibility to disruption of the construction can be reduced.

Specifically when discharging parisons, it is then frequently of considerable advantage if the wall thickness of the parison can be changed or optimized over the circumference and/or over the length of the parison while the process is running. It is necessary for this purpose that the cross section of the flow channel gap at the end of the nozzle can be changed during the discharge of the parison. The greater the adjusting possibilities which are realized in a parison head for the cross-sectional area of the flow channel gap at the nozzle outlet, the greater as a result the process engineering possibilities which can be produced by way of the parison head. It was then an aim of the invention to realize a parison head which has as many adjusting possibilities as possible for the cross-sectional area of the flow channel gap of the parison head, but which nevertheless meets the three main requirements formulated at the outset in an ideal way without restrictions. It was also an aim, in particular, to find a simple and, above all, inexpensive solution, by way of which the length of the head can also be changed, without in the process irregularities or jumps being produced in the flow channel, that is to say without dead spaces being produced in the flow channel in the process.

In the case of extrusion heads for discharging tubes or pipes, it is prior art according to W. Michaeli, Extrusionswerkzeuge für Kunststoffe und Kautschuk [Extrusion dies for plastics and natural rubber], 2nd edition, Carl Hanser Verlag Munich, ISBN 3-446-15637-2, page 2 that the nozzle or the die piece can be displaced radially by means of centering screws which are arranged over the circumference of the nozzle, in order to achieve a melt outlet which is uniform over the circumference. Here, however, the die piece is pushed out of the ideal central position, in which the flow channel is continued in an absolutely flush manner in the dividing plane between the head and the die piece. The undesired dead spaces are therefore necessarily produced in the flow channel in the region of the dividing plane between the head and the die piece, since the edge of the die piece protrudes further and further in a region which extends over half the circumference into the flow channel which is predefined by the head end and is set back further and further in the second region which lies opposite.

In order to avoid protruding edges of this type which form dead spaces for the melt flow, it is proposed in DE 42 14 241 C1 to arrange a coupling between two sleeve parts (head and nozzle), with the result that the nozzle can be displaced radially. The coupling which is shown in FIG. 1 and is not explained in further detail in the description is, as shown, not even suitable for displacing the nozzle relative to the head. If the center line which is illustrated in the coupling 14 is interpreted as a screw center line, by way of which the elastic center part (hatched on both sides) of the coupling 14 is braced over the entire circumference, the nozzle cannot be displaced without all the clamping screws being bent. Even if this were allowed, said coupling would not be free from dead spaces, since the elastic part which is situated in the center of the coupling is pressed locally radially to the outside on account of the high melt pressure in the regions between the individual clamping screws, in which regions it is not supported toward the outside as a result. As a consequence, undesired dead spaces are also produced in the flow channel in this solution.

Although the coupling which is shown in FIG. 2 and is also explained in further detail in the description permits a radial displacement of the nozzle relative to the head, the coupling which is shown with the elastic bridging member 22 is not suitable for sealing the flow channel at the high pressures which usually prevail in a melt channel. If the bridging member 22 is held in a positively locking manner as described via a clamping flange 23 (FIG. 2 and description 2/34), this is then possible only if the two circumferential edges of the elastic bridging member 22 are tensioned (compressed) by means of the clamping flanges 23.

On account of the incompressibility (the material density is not changed by external forces), the material has to be displaced from the two circumferential grooves of the clamping flanges 23 in the only possible (free) radial direction as a result of the compressing of the bridging member 22. However, this in turn leads to the two free edges of the bridging member 22 in the two edge regions close to the sleeve parts 10 and 11 being pushed into the flow channel 13 and in the process necessarily lifting off from the two edges of the sleeve parts 10 and 11, with the result that dead spaces are once again produced in the flow channel. This is dependent firstly on whether the melt which is under pressure or not is situated in the flow channel. If the pressure which prevails in the flow channel is then added, the bridging member 22 is additionally also pressed radially to the outside until its rear side comes into contact with the inner surfaces of the clamping flanges 23. In the process, the two side faces of the bridging member 22 are then lifted up further from the side edges of the two sleeve parts 10 and 11 and melt penetrates into the clearance which is produced as a result. It has additionally been shown in practice that the elastomers, even if they have a high Shore hardness, are pressed through existing open gaps on account of the high pressure, under which the melt lies in the flow channel, which leads to the bridging member 22 being "extruded out" over time through the rear-side gap between the two clamping flanges 23, with the result that the solution which is described in FIG. 2 then fails completely. It is likewise not possible to change the head length by way of this solution. In addition, separate clamping flanges 23 are also required, in order to clamp the coupling into the head housing.

DE 10 2009 058 361 B3 then describes a solution, in which the end part 3 (nozzle) is mounted such that it can be tilted in any desired direction relative to the housing main body by means of an elastically deformable seal. Said solution, in which the elastic seal is supported on its rear side by the housing part and is therefore prevented from being capable of yielding to the outside, seals the flow channel 4 reliably with respect to the pressurized melt at least in the non-tilted position. In the case of tilting of the end part 3, however, the elastic multifunctional part is compressed to a greater or lesser extent in regions. Contrary to the original assumption that the edges of the seal remain flush with the flow channel 4 on account of the friction on the side faces and the seal is pushed into the flow channel only in the center in a bulged manner, it has been shown in practice, however, that the seal is pushed over its entire height into the flow channel, whereby the undesired dead spaces are again produced in the flow channel. This already occurs in the case of slight tilting of the nozzle. It of course becomes more critical in said solution if an attempt were made to change the length of the housing even only to a slight extent, since the multifunctional part would be pushed over the entire circumference into the flow channel to an even greater extent in the process.

Heads for discharging parisons for extrusion blow molding as a rule have the possibility for a relative adjustment and an overall adjustment of the outlet gap of the flow channel. Relative adjustment is to be understood to mean that, starting from the neutral position, the flow channel gap is reduced on one side and is enlarged by the same amount on the opposite side, which is achieved by way of displacement or else by way of tilting of the nozzle. In order, however, for it to be possible to realize an overall adjustment (adjustment of the flow channel gap over the entire circumference by the same amount), a certain amount of leakage of the head has to be accepted in the prior art. In the case of the relative adjustment for optimizing the parison profile or for producing curved tubes, the nozzles are usually displaced relative to the mandrel, as is also the case in casing heads. For centering purposes and for the production of a curved tube, the nozzle end piece is displaced in the centering plane in extrusion blow molding during the discharge of the preform by means of great forces which are usually applied via hydraulic pistons (DE 29707060 U1 and DE 19537132 C2), dead spaces once again being produced in the flow channel. In addition, unavoidable wear arises in the dividing plane of the two housing parts as a result of the cyclical displacement.

In DE 10 2004 028 100 A1, DE 10 2004 057 974 A and in DE102005026726 A1, the two housing parts are therefore connected to one another with the aid of a ball joint and a spherical cap-shaped bearing shell for the relative adjustment. Although the formation of dead spaces in the flow channel is avoided in this way, it has to be accepted that a certain leakage flow occurs via the ball joint. The ball joint requires a minimum gap, in order that the ball can move in the bearing socket. Melt penetrates to the outside from the flow channel through said gap. This solution is therefore unsuitable for realizing an absolute seal of the flow channel with respect to the pressurized low-viscosity melt. Moreover, it is also a technically very complicated and therefore expensive solution which is assembled from a large number of individual parts which have to be manufactured precisely, and is therefore also very expensive to manufacture. It also cannot be avoided in said solution that wear occurs in the bearing region over relatively long operating times.

As has already been mentioned, in addition to the relative adjustment possibilities described, there are also solutions in extrusion blow molding, by way of which solutions an overall adjustment of the outlet gap of the flow channel is possible, in order for it to be possible to perform wall thickness optimization of a tubular preform. EP 0 945 245 A1 describes a solution, by way of which both the mandrel length and the length of the outer housing can be changed. In conjunction with a conical flow channel profile at the end of the flow channel, a uniform increase or decrease in size of the flow channel gap at the outlet from the nozzle can be achieved in this way. Here, either a sleeve is displaced on a round core or else a core is displaced in a round sleeve. In order that the parts can be displaced relative to one another, however, it is once again necessary that there has to be at least a minimum gap between the core and the sleeve. A minimum leakage flows which exits through said gap therefore also cannot be avoided in said solutions for the overall adjustment of the flow channel geometry. The important requirement for an absolutely sealed head is therefore also not met in the known solutions for extrusion blow molding. In addition, the solutions for the overall adjustment are complicated constructions with many individual components which also again have to be manufactured with high precision. These constructions which are configured according to the prior art therefore also do not meet the requirements for a simple and inexpensive solution.

Moreover, there are solutions in extrusion blow molding, in order to change the wall thickness of the tube which is discharged at defined locations over the length and over the circumference of the preform (DE 2654001, DE 19931870 and EP 1685943). However, these systems for dynamic radial wall thickness control require special deformable nozzles and corresponding drives for local deformation of the nozzles and a suitable additional controller for the drives. They are therefore even more complicated from a technical viewpoint and even more expensive to manufacture than the technologies which have already been described.

It is desirable to realize a simpler head solution for discharging a parison, which head solution is inexpensive to manufacture and operationally reliable, and by way of which head solution both an overall adjustment and at the same time a relative adjustment of the flow channel gap at the end of the flow channel is possible, which is absolutely sealed in the process, however, in which no dead spaces also occur in the flow channel, and in which no wear problems exist during operation. Moreover, it was also an aim of the invention as far as possible to also realize a head solution which makes dynamic radial wall thickness control possible in a simple way in extrusion blow molding, without it being necessary for metallic head components to be deformed in a complicated manner for this purpose.

According to an aspect of the present invention, a trifunctional component is integrated into the parison head, which trifunctional component makes a sealing function, a tilting function and a displacement function possible. The trifunctional component according to the invention not only seals the two head parts reliably, it also makes it possible at the same time that the nozzle can be tilted relative to the head (relative adjustment) and also that the nozzle can be displaced in the axial direction relative to the head (overall adjustment). In this way, the process engineering possibilities of the head which are aimed for are obtained by way of only four simple head parts which are inexpensive to manufacture, namely a head housing, a core, a nozzle and the trifunctional component, without there being gaps in the head, through which gaps the melt can escape from the flow channel, and without dead spaces occurring in the flow channel.

In detail, this is, according to the invention, a parison head for discharging a parison for producing capillaries, tubes or pipes, consisting of or comprising a sleeve-shaped housing, into which the melt is fed, and which surrounds a core which is clamped fixedly into the housing such that it is spaced apart on all sides, and a likewise sleeve-shaped nozzle which likewise surrounds the core such that it is spaced apart on all sides, the housing and the nozzle surrounding the core in such a way that there is a flow channel between the housing and the core and between the nozzle and the core, and that an outlet gap is formed by the nozzle and the core at the end of the flow channel, characterized in that an inexpensive, trifunctional component which can be exchanged rapidly is situated between the housing and the nozzle, which component seals the flow channel between the housing and the nozzle reliably, and by way of which component the angle between the housing and the nozzle and also the head length can be changed while retaining the flow resistance in the region of the trifunctional component and while retaining a flow channel which is free from dead spaces, with the result that the cross section of the flow channel gap at the end of the flow channel can be changed in this way.

The outlet gap is the gap between the nozzle and the core, which gap is present at the end of the flow channel of the nozzle. A flow channel which is free from dead spaces is distinguished by the fact that there are no abrupt dimensional changes in the flow channel. By way of the parison head according to the invention, both a relative adjustment of the flow channel gap and an overall adjustment of the cross-sectional area of the flow channel gap are possible for the first time as a result of the integration of a single simple trifunctional component into a parison head, the nozzle always remaining reliably sealed.

In the special head solution, the flow resistance of the flow channel in the region of the trifunctional component remains unchanged even in the case of a change of the relative position between the trifunctional component and the housing. Despite an adjustment, the flow channel edges of the trifunctional component also always remain flush with the housing and the nozzle, with the result that no dead spaces are formed in the flow channel. If parison heads according to the invention are used for extrusion blow molding, it is particularly advantageous if the wall of the flow channel does not run conically, as generally customary in the case of heads for extrusion blow molding, at the end of the core and at the end of the nozzle, but at least only at the end of the core or else only at the end of the nozzle, but rather runs cylindrically in a first approximation, and that either the nozzle or else the core or else the nozzle and the core has/have at least one local profiling over the circumference in the end region of the flow channel, which local profiling can be pushed out of the region of the flow channel by way of a change in the head length.

The flow channel should ideally be exactly cylindrical, but the desired effect can also be achieved with a small conicity in the flow channel, for which reason a flow channel which has an angle with respect to the center axis of the head of less than 10° is considered to be cylindrical in a first approximation in the context of this invention. A local profiling is then pushed out of the region of the flow channel if a second flow channel wall is no longer situated at least opposite the region of the profiling. Since parison heads are operated at elevated temperatures, it is advantageous if the trifunctional component is composed of a metal. In order to always reliably seal the flow channel, the external diameter of the lip of the trifunctional component should be slightly greater in the non-mounted state than the internal diameter of the housing. In order to mount the trifunctional component, the housing is heated and the trifunctional component is cooled, in order to enlarge the diameter of the housing and in order to reduce the size of the trifunctional component. After the trifunctional component is pushed into the housing, the sealing force which is required for sealing purposes between the lip of the trifunctional component and the inner wall of the housing is then built up during equalization of the temperature.

If melts are to be discharged from the head at temperatures which are not excessively high, it can also be sufficient if the trifunctional component is a highly temperature-resistant elastomer component which is clamped in a positively locking manner in a groove which is formed from the housing and the nozzle, and the cross-sectional area of which is enlarged in the radial direction to the outside, and which is greater on the side which faces away from the flow channel than the cross-sectional area of the elastomer component, the elastomer component being supported against the rear-side wall of the groove on the side which faces away from the flow channel.

With the use of a head in accordance with this invention, a method can then be realized, in which, by means of screws or actuators, the angle between the housing and the nozzle and the head length are changed jointly or else only the angle between the housing and the nozzle or only the length of the head is changed in order to discharge the parison and in order to optimize the wall thickness of the parison, and that, via this, the cross-sectional area of the flow channel gap at the end of the nozzle and, as a result, also the thickness of the parison which is discharged from the flow channel gap of the parison head are varied. Extended process engineering possibilities arise if the parison head has a deformable nozzle, with the result that the outlet gap s at the end of the nozzle can be changed additionally during a running process by way of a local adjustment of the nozzle at defined locations over the circumference. During the tube extrusion, both eccentric thickness differences in the tube and asymmetrical thickness changes over the circumference of the tube can be corrected by way of a parison head which is designed in this way.

It is also possible by way of a parison head according to the invention to measure the thickness distribution of the parison which is discharged by means of sensors continuously or at least at short time intervals at least at one location during the running process, and to compare the determined actual wall thickness in a regulator with the setpoint wall thickness which is predefined for the respective location, with the result that a regulator can determine correction values, by way of which the geometry of the flow channel gap is changed by means of automatically actuable actuating means, in order in this way to reduce the difference between the desired setpoint value and the measured actual value of the wall thickness.

BRIEF DESCRIPTION OF THE DRAWINGS

The invention will be explained in detail using the diagrammatic drawings, in which.

DETAILED DESCRIPTION

Figure 1:
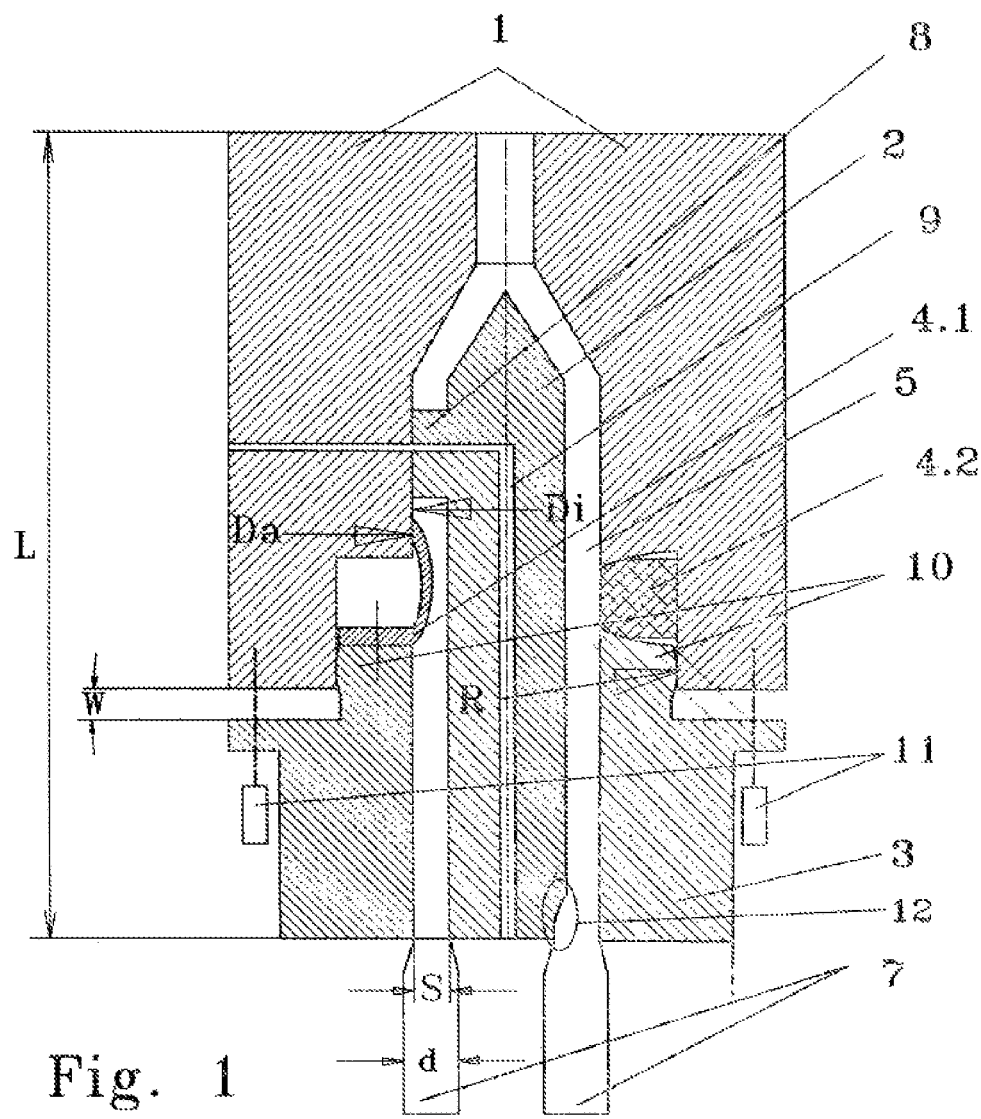
FIG. 1 shows one embodiment of the parison head according to the invention in a sectional illustration with a metallic trifunctional component in the left-hand head half and an elastic trifunctional component in the right-hand head half.

In the ideal case, the parison head comprises or consists merely of four individual parts, the sleeve-shaped housing (1), the core (2) which is fastened fixedly in the center of the housing (1) via spider-leg mandrels (8) in the embodiment which is shown in FIG. 1, the sleeve-shaped nozzle (3) which is connected to the housing (1), and the trifunctional component (4.1 or 4.2). The sleeve-shaped core (2) ideally but not necessarily has a bore (9), through which, for example, air can be blown if required. The trifunctional component (4) is situated between the housing (1) and the nozzle (3) and seals the flow channel (5) of the parison head between the housing (1) and the nozzle (3). The parison head does not require more individual parts. Further parts can of course also be attached to the parison head for different reasons, but this changes nothing about the basic construction according to the invention of the parison head.

The trifunctional component (4) is then a central constituent part of the invention. It assumes three functions which are important for the utilization of the head at the same time in the parison head. Firstly, it reliably seals the flow channel (5). Secondly, it also at the same time makes it possible that the nozzle (3) can be tilted relative to the housing (1). Thirdly, it also allows the nozzle (3) to be capable of being displaced relative to the housing (1) and to the core (2). To this end, as shown by way of example in FIG. 1, the housing (1) has a hollowed-out portion at its end, into which hollowed-out portion the nozzle (3) can be pushed, which nozzle (3) has a circumferential collar (10) on the side which faces the housing (1). A radius R which permits tilting of the nozzle (3) relative to the housing (1) is situated on the outer side of the collar (10). There is a close fit between the collar (10), the nozzle (3) and the hollowed-out portion of the housing (1) for precise centering of the nozzle (3) in the housing (1).

The trifunctional component (4) is ideally composed of a metal. It can be used universally in the entire temperature range which is used in extrusions and is also suitable for melt compounds with an abrasive action. It is most favorable if the trifunctional component (4.1) is composed of a spring steel. In order to ensure reliable sealing, it is advantageous if the external diameter Da of the sealing lip of the trifunctional component (4.1) is larger by a minimum extent than the internal diameter Di of the housing (1), with respect to which the trifunctional component (4.1) has to seal. In order to mount the metallic trifunctional component (4.1), the housing (1) is heated and the trifunctional component (4.1) is cooled. When the temperatures of both components have equalized after mounting, the lip of the trifunctional component (4.1) presses against the inner wall of the housing (1) and thus seals it. During operation, the sealing force is increased further, since the melt pressure additionally presses the lip to the outside.

It is in principle also conceivable that the trifunctional component (4.1) is composed of a metal which has a greater thermal expansion than the housing (1). The external diameter Da of the sealing lip of the metallic trifunctional component (4.1) can then be as large as or even smaller to a minimum extent than the diameter of the housing (1). The required sealing force between the lip of the trifunctional component (4.1) and the housing (1) is then built up during heating of the head to the processing temperature of the melt. For further improvement of the wear behavior, it can be advantageous if the flow channel surface of the trifunctional component (4.1) is additionally provided with a special wear protective layer or the surface of the sealing lip of the trifunctional component (4.1) is provided with a special sliding layer. It is of course also possible to rotate the trifunctional component (4.1) by 180°, with the result that the sealing lip then seals with respect to the nozzle (3).

Changes in the head length L in the range greater than 20 mm can certainly be realized by way of a metallic trifunctional component (4.1). The trifunctional component (4.1) can of course also be welded directly to the end of the housing (1) or else to the start of the nozzle (3). The housing (1) or the nozzle (3) then also assumes the functions of the trifunctional component (4), and the parison head then even comprises or consists only of three parts. However, this has the considerable disadvantage that rapid and, above all, inexpensive changing or exchanging of the trifunctional component (4) is no longer possible.

If no great requirements are made of the wear resistance of the trifunctional component (4), the extrusion temperatures are not too high, and no great length changes are required, the trifunctional component (4) can also be composed of an elastic material. In order to ensure reliable sealing by way of an elastic trifunctional component (4.2), of the flow channel (5) in the seal groove which is formed during pushing of the journal (10) of the nozzle (3) into the hollowed-out portion of the housing (1), it is firstly important that the elastic trifunctional component (4.2) is pressed to a defined length E with a sufficient pressure onto the walls of the housing (1) and the nozzle (3). Here, the pressure should be greater than the melt pressure which prevails in the flow channel. In addition, however, it is absolutely necessary that the trifunctional component (4.2) is supported on its rear side by the housing (1), and that it is therefore avoided that the melt pressure pushes the trifunctional component (4) radially to the outside. Here, the supported length D should ideally be greater than the length B which forms the flow channel surface and which is subjected to the melt pressure as a consequence. In this way, it is firstly ensured that the flow channel is sealed reliably in every case.

However, the trifunctional component (4.2) should also not in any case be pushed into the flow channel (5) during tilting and during displacing of the nozzle (3), since the edges of the trifunctional component (4.2) would then be raised up automatically from the edges of the housing (1) and the nozzle (3) in the flow channel (5) and, as a consequence, dead spaces would occur in the flow channel (5). In order to avoid this, the seal groove, in which the trifunctional component (4.2) is clamped between the housing (1) and the nozzle (3), has the lowest height B, for example in the region which forms the flow channel surface. In addition, however, the clearance (13) is still at least necessary in the seal groove, which clearance (13) is not filled by the trifunctional component (4.2) in the neutral state of the parison head. If the trifunctional component (4.2) is then compressed further in order to change the angle W or else the head length L with respect to the neutral state, the compressed elastic material is then pressed to the outside on account of the seal groove which widens radially to the outside, where the said elastic material fills the existing clearance partially or completely. Here, the clearance (13) is dimensioned in such a way that ideally a small residual clearance (13) still remains despite the maximum permitted tilting angle W or the maximum permitted change in the head length L being reached. This ensures that the elastic trifunctional component (4.2) cannot be pushed into the flow channel (5).

Figure 2:
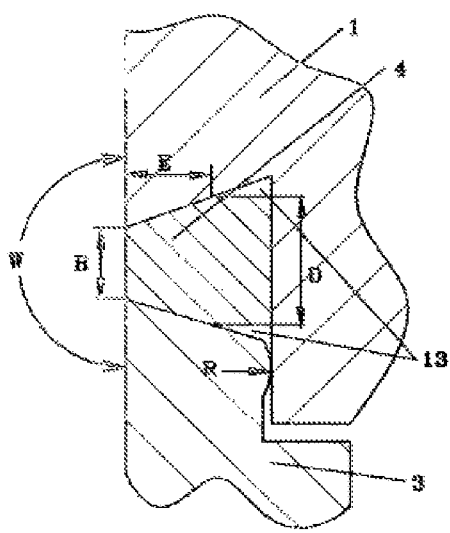
FIGS. 2-4 show examples of design shapes according to the invention of the seal groove and the trifunctional component.
Figure 3:
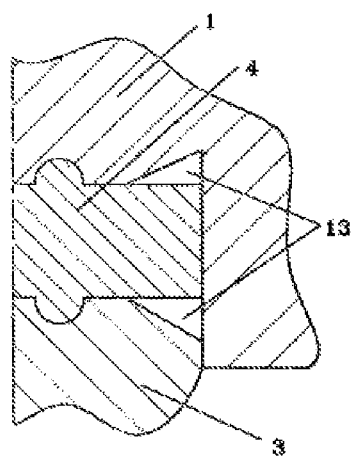
Figure 4:
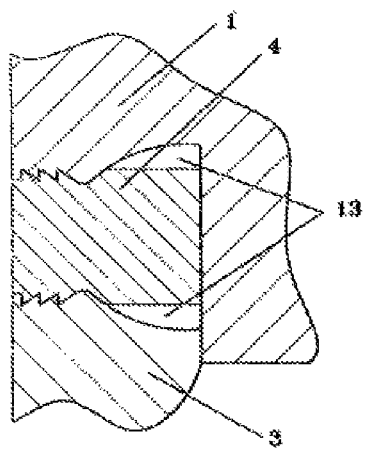

In this application, the head length L is to be understood to mean the length of the head starting on the side of the housing (1), where the melt is fed in, and ending at the end of the nozzle (3), where the melt leaves the parison head. The shape of the trifunctional component (4.2) which is shown in the exemplary embodiment shown in FIG. 1 is only one of many possible shapes according to the invention. FIGS. 2 to 4 show by way of example further possible design possibilities for the groove. It is important here in each case that the geometric design of the seal groove and that of the trifunctional component (4.2) avoid it being possible for the trifunctional component (4.2) to be pushed into the flow channel and there being sufficient clearance (13), in which the elastic material which is displaced during tilting or during displacing can accumulate. It can also be advantageous here if the surfaces of the groove walls of the housing (1) and the nozzle (3) have a defined roughness which impedes sliding of the trifunctional component (4.2) on the groove walls.

By way of the very simple parison head according to the invention, methods can be carried out, for which previously very complicated head constructions had to be used, in which in each case separate functional units were required in the heads for changing the angle W and the length L. Thus, a parison (7), for example, can be discharged from a parison head according to the invention and, in order to optimize the wall thickness of the parison (7), the angle W between the housing (1) and the nozzle (3) and the head length L can be changed jointly or else only the angle W or only the length L can be changed. Here, screws or else actuators (11) can be used, in order to change the cross-sectional area of the flow channel gap (s) at the end of the nozzle (3) and, as a consequence, also the thickness (d) of the parison which is discharged from the flow channel gap (s) of the parison head.

In the field of tube or pipe extrusion, the thickness distribution of the parison (7) which is discharged from the parison head can therefore be measured continuously or at least at short time intervals during running process at least at one location by means of sensors, in order for it to be possible to compare the determined actual wall thickness in a regulator with the setpoint wall thickness which is predefined for the respective location, and in order to determine correction values via a regulator, by way of which correction values the geometry of the flow channel gap (s) is changed by means of automatically actuable actuating means, in order in this way to reduce the difference between the desired setpoint value and the measured actual value of the wall thickness. In this way, the wall thickness tolerance can be reduced further in comparison with the tolerances which can be achieved at present, it being possible for eccentric thickness differences and asymmetrical thickness differences to be corrected by means of dedicated separate regulating circuits or else regulating circuits which are linked to one another.

In extrusion blow molding, extended process engineering options which cannot be realized by way of the previous prior art for adapting the thickness distribution in the preform in accordance with the necessities which are predefined by the part to be manufactured likewise arise by way of the parison head according to the invention. A maximum number of setting possibilities is achieved here if a deformable nozzle (3) is used as nozzle (3) in the parison head, and if in this way the outlet gap (s) at the end of the nozzle (3) is additionally changed during a running process by way of a local adjustment of the nozzle (3) at defined locations over the circumference.

The invention claimed is:

1. A parison head for discharging a parison for producing capillaries, tubes or pipes, comprising:
    a sleeve-shaped housing into which a melt is fed and which surrounds a core which is clamped fixedly into the housing such that the housing is spaced apart from the core on all sides;
    a sleeve-shaped nozzle which surrounds the core such that the nozzle is spaced apart from the core on all sides;
    the housing and the nozzle surrounding the core in such a way that there is a closed flow channel between the housing and the core and between the nozzle and the core;
    wherein a circumferential closed flow channel gap is formed by the nozzle and the core at an end of the flow channel; and
    an exchangeable trifunctional component situated between the housing and the nozzle, wherein the trifunctional component seals the flow channel between the housing and the nozzle, and by way of the trifunctional component an angle between the housing and the nozzle and also a head length can be changed while retaining flow resistance in a region of the trifunctional component and while retaining a flow channel which is free from dead spaces, with a result that a cross section of the flow channel gap at the end of the flow channel is variable in this way,
    wherein a wall of the flow channel does not run conically at an end of the core and at the end of the nozzle, but at least only at the end of the core or else only at the end of the nozzle, but rather runs cylindrically in a first approximation, and the nozzle and/or the core has/have at least one local profiling over a circumference in the end region of the flow channel, which local profiling can be pushed out of a region of the flow channel by way of a change in the head length.

2. The parison head as claimed in claim 1, wherein, upon a change in relative position between the trifunctional component and the housing, flow resistance of the flow channel remains unchanged in the region of the trifunctional component, and flow channel edges of the trifunctional component always remain flush with the housing and the nozzle.

3. The parison head as claimed in claim 1, wherein the trifunctional component is composed of a metal, and an external diameter of the lip of the trifunctional component is greater in the non-mounted state than an internal diameter of the housing.

4. The parison head as claimed in claim 1, wherein the trifunctional component is a temperature-resistant elastomer component which is clamped in a positively locking manner in a groove which is formed from the housing and the nozzle, and a cross-sectional area of the tri-functional component is enlarged in a radial direction to an outside, and the cross-sectional area of the tri-functional component is greater on a side of the tri-functional component which faces away from the flow channel than a cross-sectional area of the temperature-resistant elastomer component, the temperature-resistant elastomer component being supported against the rear-side wall of the groove on a side of the temperature resistant elastomer component which faces away from the flow channel.

* * * * *